(12) United States Patent
Katsura

(10) Patent No.: US 11,260,620 B2
(45) Date of Patent: Mar. 1, 2022

(54) FUNCTIONAL LAMINATE AND PRODUCTION METHOD THEREFOR

(71) Applicant: MAZDA MOTOR CORPORATION, Hiroshima (JP)

(72) Inventor: Daiji Katsura, Etajima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 143 days.

(21) Appl. No.: 16/498,337

(22) PCT Filed: Feb. 16, 2018

(86) PCT No.: PCT/JP2018/005546
§ 371 (c)(1),
(2) Date: Sep. 26, 2019

(87) PCT Pub. No.: WO2018/179977
PCT Pub. Date: Oct. 4, 2018

(65) Prior Publication Data
US 2020/0368996 A1    Nov. 26, 2020

(30) Foreign Application Priority Data
Mar. 31, 2017  (JP) ............................. JP2017-072516

(51) Int. Cl.
  *B32B 5/02*     (2006.01)
  *B32B 5/18*     (2006.01)
  *B32B 5/24*     (2006.01)

(52) U.S. Cl.
  CPC ................ *B32B 5/022* (2013.01); *B32B 5/18* (2013.01); *B32B 5/245* (2013.01); *B32B 2260/046* (2013.01); *B32B 2307/718* (2013.01)

(58) Field of Classification Search
  CPC ............ B32B 5/022; B32B 5/18; B32B 5/245
  USPC ....................................... 428/292.1
  See application file for complete search history.

(56) References Cited

U.S. PATENT DOCUMENTS

| | | | |
|---|---|---|---|
| 2009/0298374 | A1 | 12/2009 | Delmas |
| 2014/0332313 | A1 | 11/2014 | Bischoff et al. |
| 2020/0368996 | A1* | 11/2020 | Katsura ..................... B32B 5/18 |

FOREIGN PATENT DOCUMENTS

| | | |
|---|---|---|
| EP | 0 555 476 A1 | 8/1993 |
| EP | 3581613 A1 | 12/2019 |
| EP | 3587102 A1 | 1/2020 |
| JP | H04-141405 A | 5/1992 |
| JP | H06-171002 A | 6/1994 |
| JP | H08-142245 A | 6/1996 |
| JP | 2000-062061 A | 2/2000 |
| JP | 2002-275749 A | 9/2002 |
| JP | 2005-144060 A | 6/2005 |
| JP | 2005-288873 A | 10/2005 |
| JP | 2009-534241 A | 9/2009 |

(Continued)

OTHER PUBLICATIONS

International Search Report issued in PCT/JP2018/005546; dated May 15, 2018.

*Primary Examiner* — Betelhem Shewareged
(74) *Attorney, Agent, or Firm* — Studebaker & Brackett PC

(57) ABSTRACT

Provided is a functional laminate including a porous intermediate layer having air permeability laminated between a porous surface layer and a resin foamed layer, the porous intermediate layer having an average void ratio smaller than that of the porous surface layer.

19 Claims, 2 Drawing Sheets

(56) References Cited

FOREIGN PATENT DOCUMENTS

| | | |
|---|---|---|
| JP | 2011-148204 A | 8/2011 |
| JP | 2014-531356 A | 11/2014 |
| JP | 2015-138055 A | 7/2015 |
| JP | 201645450 A | 4/2016 |
| WO | 93/03904 A1 | 3/1993 |
| WO | 2012173104 A1 | 12/2012 |
| WO | 2014/157080 A1 | 10/2014 |
| WO | 2018179978 A1 | 10/2018 |

* cited by examiner

FUNCTIONAL LAMINATE AND PRODUCTION METHOD THEREFOR

TECHNICAL FIELD

The present disclosure relates to a functional laminate and a production method therefor.

BACKGROUND ART

In recent years, many attempts have been made, in engine-equipped machines such as vehicles (such as automobiles, trucks, buses, and trains) and agricultural machines (such as mowers and cultivators), to absorb sounds emitted by engines.

In the field of automobiles in particular, in view of riding comfort for passengers, attempts are being made to absorb engine sounds by covering powertrain members including an engine and a transmission with a sound absorbing material. For the cover member, a urethane foam or a fiber nonwoven fabric is used alone, for example.

By the way, reported is an integrally foamed product including a latex foam thin layer directly applied to the inner surface of a fabric and a main body foam directly injected onto the inner surface, foamed, and cured as an integrally foamed product such as a head rest, a seat, a seat back, or an arm rest (Patent Document 1). In such an integrally foamed product, the latex foam thin layer is mechanically connected to fibers on the inner surface of the fabric so as to embrace them in a region near the fabric to form a connected region and forms an air-permeable skin substantially preventing a main body foam raw liquid from entering on the outside.

Also reported is a foamed molded body in which a sheet member is integrated with the outer surface of a foamed molded main body as a foamed molded body such as a chair or cushion (Patent Document 2). In such a foamed molded body, the sheet member includes a laminate of a stretched porous film and a nonwoven fabric and has properties to allow gas to pass therethrough and to block liquid.

CITATION LIST

Patent Document

[Patent Document 1] WO 93/03904
[Patent Document 2] Japanese Unexamined Patent Publication No. 2011-148204

SUMMARY OF THE INVENTION

Technical Problem

The inventor of the present disclosure has applied the techniques about the foamed product or the foamed molded body to a cover member of powertrain members, for example, to find a new problem of insufficiently obtaining sound absorbability.

Given these circumstances, the inventor of the present disclosure has found out that even when foaming molding is performed in a mold in the presence of a glass fiber nonwoven fabric, for example, sound absorbability cannot still sufficiently be obtained.

It is an object of the present disclosure to provide a functional laminate sufficiently excellent in sound absorbability.

It is also an object of the present disclosure to provide a functional laminate sufficiently excellent in not only sound absorbability but also thermal insulating properties.

Solution to the Problem

The present disclosure relates to a functional laminate including a porous intermediate layer having air permeability laminated between a porous surface layer and a resin foamed layer, the porous intermediate layer having an average void ratio smaller than that of the porous surface layer.

Advantages of the Invention

A functional laminate of the present disclosure is sufficiently excellent in sound absorbability.

The functional laminate of the present disclosure is sufficiently excellent also in thermal insulating properties.

DESCRIPTION OF EMBODIMENTS

[Functional Laminate]

A functional laminate of the present disclosure relates to a laminate including at least sound absorbability; the functionality includes performance such as sound absorbability, thermal insulating properties, and damping properties.

Figure 1:
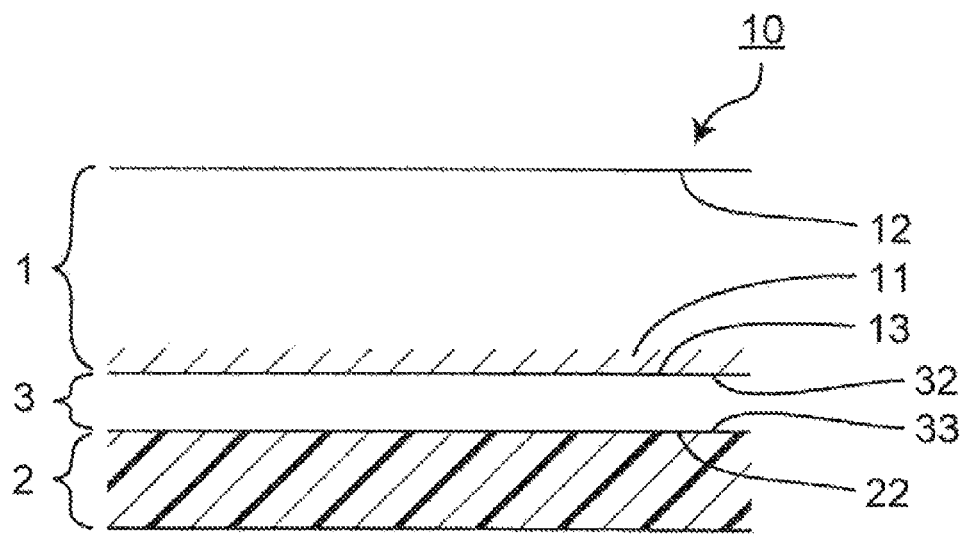
FIG. 1 illustrates a schematic sectional view of a functional laminate of the present disclosure.

As illustrated in FIG. 1, this functional laminate 10 of the present disclosure includes a specific porous intermediate layer 3 laminated between a porous surface layer 1 and a resin foamed layer 2, in which the porous surface layer 1, the resin foamed layer 2, and the porous intermediate layer 3 are connected and integrated together. As described below, the specific porous intermediate layer 3 is more likely to cause the capillary phenomenon than the porous surface layer 1 is owing to at least a difference in an average void ratio, and thus before the foaming of a foaming resin (a raw liquid) forming the resin foamed layer 2, the porous intermediate layer 3 is likely to hold the foaming resin. Given these circumstances, the porous intermediate layer 3 moderately hinders the movement (impregnation) of the foaming resin into the porous surface layer 1, and upon start of foaming, the foaming resin held by the porous intermediate layer 3 foams while permeating the porous surface layer 1. It is conceivable that, consequently, the amount of impregnation of the foaming resin into the porous surface layer 1 is moderately reduced, the foaming resin sufficiently foams, and thus sufficiently improving sound absorbability and thermal insulating properties. It is conceivable that when the porous intermediate layer is not limited, and when the porous intermediate layer having an average void ratio not less than an average void ratio of the porous surface layer is used, the foaming resin moves (is impregnated) into the porous surface layer in an excessive amount during foaming molding, the foaming resin does not sufficiently foam within the porous surface layer, and thus sound absorbability and thermal insulating properties are degraded. FIG. 1 illustrates a schematic sectional view of the functional laminate of the present disclosure.

In the present disclosure, the capillary phenomenon refers to a physical phenomenon about the behavior of the foaming resin (liquid) within voids of the porous intermediate layer 3 and the porous surface layer 1. The likelihood of the occurrence of the capillary phenomenon can be controlled by, for the voids of the porous intermediate layer 3 and the porous surface layer 1, adjusting at least a difference in the average void ratio and preferably differences in the average void ratio and an average void diameter. Specifically, the smaller the average void ratio becomes, the more the capillary phenomenon is likely to occur. The smaller the average void diameter becomes, the more the capillary phenomenon is likely to occur.

Consequently, in the present disclosure, the porous intermediate layer 3 has an average void ratio smaller than that of the porous surface layer 1 as described below. In the present disclosure, the porous intermediate layer 3 preferably has not only the average void ratio but also an average void ratio smaller than that of the porous surface layer in view of the likelihood of the occurrence of the capillary phenomenon in the porous intermediate layer 3 and further improvement in sound absorbability in cover member use for automobile powertrain members. Consequently, the porous intermediate layer 3 is more likely to cause the capillary phenomenon than the porous surface layer 1 is. When the porous intermediate layer has an average void ratio larger than the average void ratio of the porous surface layer, the porous surface layer is more likely to cause the capillary phenomenon than the porous intermediate layer is, the porous intermediate layer cannot sufficiently hold the foaming resin, and the movement of the foaming resin into the porous surface layer cannot be hindered. Consequently, the amount of impregnation of the foaming resin into the porous surface layer increases, the foaming resin does not sufficiently foam, and the functional laminate does not have sufficient sound absorbability and thermal insulating properties.

(Porous Intermediate Layer)

The porous intermediate layer 3 has air permeability. The "air permeability" of the porous intermediate layer 3 is a characteristic exchangeable with "liquid permeability," that is, refers to a characteristic through which the porous intermediate layer 3 enables the foaming resin (liquid) to moderately pass therethrough during production of the functional laminate. The porous intermediate layer 3 has such air permeability, thus achieving integration of the porous surface layer 1, the resin foamed layer 2, and the porous intermediate layer 3. The air permeability of the porous intermediate layer 3 is specifically such air permeability that a mixed layer part 11 described below can be formed.

The material forming the porous intermediate layer is not limited to a particular material so long as it has the air permeability described above and is more likely to cause the capillary phenomenon than the porous surface layer is and may be a fiber nonwoven fabric or a polymer foam, for example.

Examples of the fiber nonwoven fabric of the porous intermediate layer include nonwoven fabrics of one or more organic fibers selected from the group including polyester fibers such as polyethylene terephthalate (PET) fibers and polybutylene terephthalate fibers; polyamide fibers such as aramid fibers; polyvinyl alcohol fibers; polyolefin fibers such as polyethylene fibers and polypropylene (PP) fibers; and cellulose fibers. The fiber nonwoven fabric of the porous intermediate layer may be a nonwoven fabric of one or more inorganic fibers selected from the group including glass fibers, aluminum fibers, alumina fibers, and rock wool.

For the polymer foam of the porous intermediate layer, one having an open-cell structure is used. Examples of such a polymer foam include polymer foamed layers selected from the group including a polyurethane foamed layer; a polyolefin foamed layer such as a polyethylene foamed layer and a polypropylene foamed layer; a polyester foamed layer such as a PET foamed layer; a silicone foamed layer; and a polyvinyl chloride foamed layer.

The porous intermediate layer is preferably a fiber nonwoven fabric, more preferably a nonwoven fabric of organic fibers, even more preferably a nonwoven fabric of polyolefin fibers, and most preferably a nonwoven fabric of polypropylene (PP) fibers in view of further improvement in sound absorbability in automobile member use.

The porous intermediate layer has an average void ratio smaller than that of the porous surface layer. An average void ratio $Rm$ (%) of the porous intermediate layer and an average void ratio $Rs$ (%) of the porous surface layer preferably satisfy Relational Expression (x1) below, more preferably satisfy Relational Expression (x2) below, and even more preferably satisfy Relational Expression (x3) below in view of the likelihood of the occurrence of the capillary phenomenon in the porous intermediate layer and further improvement in sound absorbability in cover member use for automobile powertrain members.

$$1.01 \leq Rs/Rm \tag{x1}$$

$$1.05 \leq Rs/Rm \leq 2 \tag{x2}$$

$$1.1 \leq Rs/Rm \leq 1.5 \tag{x3}$$

The average void ratio $Rm$ of the porous intermediate layer is normally 60 to 95% and preferably 65 to 90% in view of the likelihood of the occurrence of the capillary phenomenon in the porous intermediate layer and further improvement in sound absorbability in cover member use for automobile powertrain members.

The average void ratio of the porous intermediate layer, when the porous intermediate layer is a fiber nonwoven fabric, refers to the volume ratio of voids formed among fibers, that is, the volume ratio of inter-fiber voids and is represented by a ratio measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric to obtain the fiber nonwoven fabric alone. The volume ratio of voids in this fiber nonwoven fabric is calculated, and this value is converted into the volume ratio of voids when the thickness in the fiber nonwoven fabric is the thickness of the porous intermediate layer described below in the functional laminate. The volume ratio of voids can be calculated from the volume and mass of the fiber nonwoven fabric and properties such as the specific gravity of a fiber material. In the specification, measurement of mass was performed using an electronic balance (AE160 manufactured by Mettler). The volume ratio of voids can also be calculated from the volume of the fiber nonwoven fabric and the void volume of the fiber nonwoven fabric measured by a method such as computer tomography, an immersion method, a water evaporation method, a suspension method, a mercury penetration method, or a gas adsorption method.

As another method for measuring the volume ratio of inter-fiber voids, the nonwoven fabric of the porous intermediate layer impregnated with the foaming resin is cut out of the functional laminate, the volume of the nonwoven fabric and the void volume of the nonwoven fabric measured by a method such as computer tomography, an immersion method, a water evaporation method, a suspension method, a mercury penetration method, or a gas adsorption method are obtained, and then the fiber material is dissolved with a solvent that dissolves only the fiber material among the fibers and the foaming resin which form the nonwoven fabric to obtain the foaming resin alone. A void volume in this foaming resin is measured by a method similar to the above, the void volume of the nonwoven fabric is calculated from the volume of the nonwoven fabric−the void volume of the foaming resin+the void volume of the nonwoven fabric, and from this value and the volume of the nonwoven fabric, the volume ratio of voids in the fiber nonwoven fabric can be calculated.

The average void ratio of the porous intermediate layer, when the porous intermediate layer is a polymer foam, refers to the volume ratio of air bubbles in the polymer that the polymer foam as the porous intermediate layer intrinsically has and is represented by a ratio measured by the method below. The polymer foam of the porous intermediate layer impregnated with the foaming resin is cut out of the functional laminate, and in an optical or electron micrograph of a perpendicular section of the sample, the ratios of the area of air bubbles relative to the entire area are measured at 100 random places at which the foaming of the foaming resin does not occur to determine an average. The area of air bubbles is the area of air bubbles that the polymer foam as the porous intermediate layer intrinsically has, and the air bubbles and the air bubbles caused by the foaming of the foaming resin can be easily discriminated from each other by a difference in brightness or the like around the air bubbles. In the specification, a parallel section when an optical or electron micrograph is taken refers to a section parallel to the outer surface 12, whereas a perpendicular section refers to a section perpendicular to the outer surface 12 of the porous surface layer.

For the average void ratio of the porous intermediate layer, the value measured from the functional laminate as described above is used; even when measured from a material for use in production (foaming molding), a similar measured value is obtained. That is to say, the average void ratio of the porous intermediate layer can be calculated from the volume and mass of the porous intermediate layer material for use in production (foaming molding) and properties such as the specific gravity of the fibers or the polymer of the porous intermediate layer material. In the specification, measurement of mass was performed using an electronic balance (AE160 manufactured by Mettler). The average void ratio of the porous intermediate layer can be calculated from the volume of the porous intermediate layer material and the void volume of the porous intermediate layer material measured by a method such as computer tomography, an immersion method, a water evaporation method, a suspension method, a mercury penetration method, or a gas adsorption method. The average void ratio of the porous intermediate layer can also be calculated by measuring, in an optical or electron micrograph of a perpendicular section of the porous intermediate layer material, the ratios of the area of air bubbles relative to the entire area at 100 random places to determine an average.

An average void diameter Dm (μm) of the porous intermediate layer and an average void diameter Ds (μm) of the porous surface layer preferably satisfy Relational Expression (y1) below, more preferably satisfy Relational Expression (y2) below, and even more preferably satisfy Relational Expression (y3) below in view of the likelihood of the occurrence of the capillary phenomenon in the porous intermediate layer and further improvement in sound absorbability in automobile member use.

$$1.0 \leq Ds/Dm \leq 2{,}000 \quad (y1)$$

$$1.01 \leq Ds/Dm \leq 10 \quad (y2)$$

$$1.1 \leq Ds/Dm \leq 10 \quad (y3)$$

The average void diameter Dm of the porous intermediate layer is normally 0.04 to 90 μm and preferably 20 to 50 μm in view of the likelihood of the occurrence of the capillary phenomenon in the porous intermediate layer and further improvement in sound absorbability in cover member use for automobile powertrain members.

The average void diameter of the porous intermediate layer, when the porous intermediate layer is a fiber nonwoven fabric, refers to the diameter of a void formed between fibers, that is, the maximum inter-fiber distance at the void entrance of the void, and is represented by a 50% volume average diameter measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric to obtain the fiber nonwoven fabric alone. The distribution of the diameter of voids in this fiber nonwoven fabric is measured by a method such as a mercury penetration method or a gas adsorption method, and the 50% volume average diameter can be calculated. In the specification, measurement of the distribution of the diameter of voids was performed using a mercury penetration method (AutoPore 9400 Series manufactured by Shimadzu Corporation). As another method of measurement, the nonwoven fabric of the porous intermediate layer impregnated with the foaming resin is cut out of the functional laminate, and in an optical or electron micrograph of a parallel section of the sample, the diameters (the maximum inter-fiber distances) of 100 random voids at which the foaming of the foaming resin does not occur are measured to determine an average. The diameters of the voids to be measured are the diameters of voids appearing on the nearest side of the optical or electron micrograph.

The average void diameter of the porous intermediate layer, when the porous intermediate layer is a polymer foam, refers to the diameter of air bubbles in the polymer that the polymer foam as the porous intermediate layer intrinsically has and is represented by an average diameter measured by the method below. The polymer foam of the porous intermediate layer impregnated with the foaming resin is cut out of the functional laminate, and in an optical or electron micrograph of a parallel section of the sample, the diameters of 100 random air bubbles at which the foaming of the foaming resin does not occur are measured to determine an average. The 100 random air bubbles are air bubbles that the polymer foam as the porous intermediate layer intrinsically has, and the air bubbles and the air bubbles caused by the foaming of the foaming resin can be easily discriminated from each other by a difference in brightness or the like around the air bubbles.

For the average void diameter of the porous intermediate layer, the value measured from the functional laminate as described above is used; even when measured from a material for use in production (foaming molding), a similar measured value is obtained. That is to say, the distribution of the diameter of voids in the porous intermediate layer material for use in production (foaming molding) is measured by a method such as a mercury penetration method or a gas adsorption method, and the 50% volume average diameter can be calculated. In the specification, measurement of the distribution of the diameter of voids was performed using a mercury penetration method (AutoPore 9400 Series manufactured by Shimadzu Corporation). In an optical or electron micrograph of a parallel section of the porous intermediate layer material, the diameters of 100 random voids (the maximum inter-fiber distances or the diameters of air bubbles) are measured to determine an average. The diameters of the voids to be measured are the diameters of voids appearing on the nearest side of the optical or electron micrograph.

The thickness of the porous intermediate layer is normally 0.1 to 2 mm and preferably 0.2 to 1 mm in view of the likelihood of the occurrence of the capillary phenomenon in the porous intermediate layer and further improvement in sound absorbability in cover member use for automobile powertrain members.

Both when the porous intermediate layer is a fiber nonwoven fabric and when it is a polymer foam, the thickness of the porous intermediate layer is a thickness from an interface 32 of the porous intermediate layer 3 with the porous surface layer 1 to an interface 33 thereof with the resin foamed layer 2 and is represented by a thickness measured by the method below. In an optical micrograph of a perpendicular section of the functional laminate, thicknesses are measured at 100 random places to determine an average.

For the thickness of the porous intermediate layer, the value measured from the functional laminate as described above is used; even when measured from a material for use in production (foaming molding), a similar measured value is obtained. That is to say, in an optical micrograph of a perpendicular section of the porous intermediate layer material for use in production (foaming molding), thicknesses are measured at 100 random places to determine an average. Alternatively, thicknesses of the porous intermediate layer material are measured with an instrument such as a film thickness meter, a displacement meter, or a vernier caliper to determine an average.

When the porous intermediate layer is a fiber nonwoven fabric in particular, the average fiber diameter and the average fiber length of fibers forming the fiber nonwoven fabric are not limited to particular values so long as the porous intermediate layer is more likely to cause the capillary phenomenon than the porous surface layer is. The average fiber diameter is normally 0.005 to 50 µm and preferably 0.1 to 20 µm in view of the likelihood of the occurrence of the capillary phenomenon in the porous intermediate layer and further improvement in sound absorbability in automobile member use. The average fiber length is normally not less than the thickness of the porous intermediate layer material and preferably 20 mm or more in view of the likelihood of the occurrence of the capillary phenomenon in the porous intermediate layer and further improvement in sound absorbability in automobile member use.

The average fiber diameter of the fibers in the fiber nonwoven fabric of the porous intermediate layer is represented by an average diameter measured by the method below. The nonwoven fabric of the porous intermediate layer impregnated with the foaming resin is cut out of the functional laminate, and in an optical or electron micrograph of a perpendicular section of the sample, the diameters of 100 random fibers are measured to obtain an average.

The average fiber length of the fibers in the fiber nonwoven fabric of the porous intermediate layer is represented by an average measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric. The lengths of 100 random fibers are measured from the nonwoven fabric in which the foaming resin has been dissolved to determine an average. Alternatively, the inside of the nonwoven fabric is rendered into a three-dimensional image by a method such as computer tomography (CT), and the lengths of 100 random fibers are measured to determine an average.

For the average fiber diameter and the average fiber length of the fibers of the fiber nonwoven fabric, the values measured from the functional laminate as described above are used; even when measured from a material for use in production (foaming molding), similar measured values are obtained. That is to say, for the average fiber diameter of fibers of a fiber nonwoven fabric for use in production (foaming molding), in an optical or electron micrograph of a perpendicular section of the nonwoven fabric, the diameters of 100 random fibers are measured to determine an average. For the average fiber length of the fibers of the fiber nonwoven fabric for use in production (foaming molding), the lengths of 100 random fibers are measured to determine an average. Alternatively, the inside of the nonwoven fabric is rendered into a three-dimensional image by a method such as CT, and the lengths of 100 random fibers are measured to determine an average.

When the porous intermediate layer is a fiber nonwoven fabric in particular, the basis weight of the fiber nonwoven fabric is not limited to a particular value so long as the porous intermediate layer is more likely to cause the capillary phenomenon than the porous surface layer is, and is normally 5 to 500 g/m$^2$ and preferably 20 to 300 g/m$^2$ in view of the likelihood of the occurrence of the capillary phenomenon in the porous intermediate layer and further improvement in sound absorbability in automobile member use.

The basis weight of the fiber nonwoven fabric of the porous intermediate layer is represented by a value measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric to obtain the fiber nonwoven fabric alone. The basis weight can be calculated from the area and mass of the fiber nonwoven fabric. In the specification, measurement of mass was performed using an electronic balance (AE160 manufactured by Mettler). As another method of measurement, the nonwoven fabric of the porous intermediate layer impregnated with the foaming resin is cut out of the functional laminate, the fiber material is dissolved with a solvent that dissolves only the fiber material among the fibers and the foaming resin which form the nonwoven fabric to obtain a solution of the fiber material. A liquid content of this solution of the fiber material is evaporated, then the mass of the fiber material in a solid content is calculated from the mass of the solid content after evaporation, and the basis weight can be calculated from the area of the nonwoven fabric and the mass of the fiber material.

For the basis weight of the fiber nonwoven fabric, the value measured from the functional laminate as described above is used; even when measured from a material for use in production (foaming molding), a similar measured value is obtained. That is to say, the basis weight can be calculated from the area and mass of the fiber nonwoven fabric for use in production (foaming molding). In the specification, measurement of mass was performed using an electronic balance (AE160 manufactured by Mettler).

(Porous Surface Layer)

The material forming the porous surface layer 1 is not limited to a particular material so long as it has porosity and is less likely to cause the capillary phenomenon than the porous intermediate layer is and may be a fiber nonwoven fabric or a polymer foam, for example.

Examples of the fiber nonwoven fabric of the porous surface layer include nonwoven fabrics of organic fibers and nonwoven fabrics of inorganic fibers similar to those exemplified as the fiber nonwoven fabric of the porous intermediate layer.

For the polymer foam of the porous surface layer, one having an open-cell structure or a closed-cell structure is used. Examples of the polymer foam of the porous surface layer include polymer foamed layers similar to those exemplified as the polymer foam of the porous intermediate layer except that they may be ones having a closed-cell structure.

The porous surface layer is preferably a nonwoven fabric, more preferably a nonwoven fabric inorganic fibers or organic fibers, and even more preferably a nonwoven fabric of glass fibers or polyester fibers (especially PET fibers) in view of further improvement in sound absorbability in automobile member use.

The average void ratio Rs of the porous surface layer is normally 80 to 99.5% and preferably 90 to 99% in view of the likelihood of the occurrence of the capillary phenomenon in the porous intermediate layer and further improvement in sound absorbability in automobile member use.

The average void ratio of the porous surface layer, when the porous surface layer is a fiber nonwoven fabric, refers to the volume ratio of voids formed among fibers, that is, the volume ratio of inter-fiber voids and is represented by a ratio measured by the method below. The nonwoven fabric of a porous surface layer part that is not impregnated with the foaming resin is cut out of the functional laminate. The volume ratio of voids in this fiber nonwoven fabric is calculated, and this value is converted into the volume ratio of voids when the thickness in the fiber nonwoven fabric is the thickness of the porous surface layer described below in the functional laminate. The volume ratio of voids can be calculated from the volume and mass of the fiber nonwoven fabric and properties such as the specific gravity of the fibers. In the specification, measurement of mass was performed using an electronic balance (AE160 manufactured by Mettler). The volume ratio of voids can also be calculated from the volume of the fiber nonwoven fabric and the void volume of the fiber nonwoven fabric measured by a method such as computer tomography, an immersion method, a water evaporation method, a suspension method, a mercury penetration method, or a gas adsorption method.

The average void ratio of the porous surface layer, when the porous surface layer is a polymer foam, refers to the volume ratio of air bubbles in the polymer that the polymer foam as the porous surface layer intrinsically has and is represented by a ratio measured by the method below. The average void ratio of the porous surface layer can be calculated by cutting the polymer foam of the porous surface layer part that is not impregnated with the foaming resin out of the functional laminate and, in an optical or electron micrograph of a perpendicular section of the sample, measuring the ratios of the area of air bubbles relative to the entire area at 100 random places to determine an average.

For the average void ratio of the porous surface layer, the value measured from the functional laminate as described above is used; even when measured from a material for use in production (foaming molding), a similar measured value is obtained. That is to say, the average void ratio of the porous surface layer can be calculated from the volume and mass of the porous surface layer material for use in production (foaming molding) and properties such as the specific gravity of the fibers or the polymer of the porous surface layer material. In the specification, measurement of mass was performed using an electronic balance (AE160 manufactured by Mettler). The average void ratio of the porous surface layer can also be calculated from the volume of the porous surface layer material and the void volume of the porous surface layer material measured by a method such as computer tomography, an immersion method, a water evaporation method, a suspension method, a mercury penetration method, or a gas adsorption method. The average void ratio of the porous surface layer can also be calculated by measuring, in an optical or electron micrograph of a perpendicular section of the porous surface layer material, the ratios of the area of air bubbles relative to the entire area at 100 random places to determine an average.

The average void diameter Ds of the porous surface layer is normally 10 to 300 μm and preferably 20 to 150 μm in view of the likelihood of the occurrence of the capillary phenomenon in the porous intermediate layer and further improvement in sound absorbability in automobile member use.

The average void diameter of the porous surface layer, when the porous surface layer is a fiber nonwoven fabric, refers to the diameter of a void formed between fibers, that is, the maximum inter-fiber distance at the void entrance of the void, and is represented by a 50% volume average diameter measured by the method below. The nonwoven fabric of the porous surface layer part that is not impregnated with the foaming resin is cut out of the functional laminate, the distribution of the diameter of voids in this nonwoven fabric is measured by a method such as a mercury penetration method or a gas adsorption method, and the 50% volume average diameter can be calculated. In the specification, measurement of the distribution of the diameter of voids was performed using a mercury penetration method (AutoPore 9400 Series manufactured by Shimadzu Corporation). As another method of measurement, the nonwoven fabric of the porous surface layer part that is not impregnated with the foaming resin is cut out of the functional laminate, and in an optical or electron micrograph of a parallel section of the nonwoven fabric, the diameters (the maximum inter-fiber distances) of 100 random voids are measured to determine an average. The diameters of the voids to be measured are the diameters of voids appearing on the nearest side of the optical or electron micrograph.

The average void diameter of the porous surface layer, when the porous surface layer is a polymer foam, refers to the diameter of air bubbles in the polymer that the polymer foam as the porous surface layer intrinsically has and is represented by an average diameter measured by the method below. The polymer foam of the porous surface layer part that is not impregnated with the foaming resin is cut out of the functional laminate, and in an optical or electron micrograph of a parallel section of the sample, the diameters of 100 random air bubbles are measured to determine an average.

For the average void diameter of the porous surface layer, the value measured from the functional laminate as described above is used; even when measured from a material for use in production (foaming molding), a similar measured value is obtained. That is to say, the distribution of the diameter of voids in the porous surface layer material for use in production (foaming molding) is measured by a method such as a mercury penetration method or a gas adsorption method, and the 50% volume average diameter can be calculated. In the specification, measurement of the distribution of the diameter of voids was performed using a mercury penetration method (AutoPore 9400 Series manufactured by Shimadzu Corporation). In an optical or electron micrograph of a parallel section of the porous surface layer material, the diameters of 100 random voids (the maximum inter-fiber distances or the diameters of air bubbles) are measured to determine an average. The diameters of the voids to be measured are the diameters of voids appearing on the nearest side of the optical or electron micrograph.

The thickness of the porous surface layer is normally 1 to 50 mm and preferably 2 to 30 mm in view of the likelihood of the occurrence of the capillary phenomenon in the porous intermediate layer and further improvement in sound absorbability in automobile member use.

Both when the porous surface layer is a fiber nonwoven fabric and when it is a polymer foam, the thickness of the porous surface layer is a thickness including a mixed layer part described below, is a thickness from the outer surface 12 of the porous surface layer 1 to an interface 13 thereof with the porous intermediate layer 3, and is represented by a thickness measured by the method below. In an optical micrograph of a perpendicular section of the functional laminate, thicknesses are measured at 100 random places to determine an average.

For the thickness of the porous surface layer, the value measured from the functional laminate as described above is used; even when measured from a material for use in production (foaming molding), a similar measured value is obtained. That is to say, in an optical micrograph of a perpendicular section of the porous surface layer material for use in production (foaming molding), thicknesses are measured at 100 random places to determine an average. Alternatively, thicknesses of the porous surface layer material are measured with an instrument such as a film thickness meter, a displacement meter, or a vernier caliper to determine an average.

When the porous surface layer is a fiber nonwoven fabric in particular, the average fiber diameter and the average fiber length of fibers forming the fiber nonwoven fabric are not limited to particular values so long as the porous intermediate layer is more likely to cause the capillary phenomenon than the porous surface layer is. The average fiber diameter is normally 0.005 to 50 μm and preferably 0.1 to 20 μm in view of the likelihood of the occurrence of the capillary phenomenon in the porous intermediate layer and further improvement in sound absorbability in automobile member use. The average fiber length is normally 2 mm or more and preferably 20 mm or more in view of the likelihood of the occurrence of the capillary phenomenon in the porous intermediate layer and further improvement in sound absorbability in automobile member use.

The average fiber diameter of the fibers in the fiber nonwoven fabric of the porous surface layer is represented by an average diameter measured by the method below. The nonwoven fabric of the porous surface layer part that is not impregnated with the foaming resin is cut out of the functional laminate, and in an optical or electron micrograph of a perpendicular section of the sample, the diameters of 100 random fibers are measured to determine an average.

The average fiber length of the fibers in the fiber nonwoven fabric of the porous surface layer is represented by an average measured by the method below. The nonwoven fabric of the porous surface layer part that is not impregnated with the foaming resin is cut out of the functional laminate, and the lengths of 100 random fibers are measured from the nonwoven fabric to determine an average. Alternatively, the inside of the nonwoven fabric is rendered into a three-dimensional image by a method such as CT, and the lengths of 100 random fibers are measured to determine an average.

For the average fiber diameter and the average fiber length of the fibers of the fiber nonwoven fabric, the values measured from the functional laminate as described above are used; even when measured from a material for use in production (foaming molding), similar measured values are obtained. That is to say, for the average fiber diameter of the fibers of the fiber nonwoven fabric for use in production (foaming molding), in an optical or electron micrograph of a perpendicular section of the nonwoven fabric, the diameters of 100 random fibers are measured to determine an average. For the average fiber length of the fibers of the fiber nonwoven fabric for use in production (foaming molding), the lengths of 100 random fibers are measured to determine an average. Alternatively, the inside of the nonwoven fabric is rendered into a three-dimensional image by a method such as CT, and the lengths of 100 random fibers are measured to determine an average.

When the porous surface layer is a fiber nonwoven fabric in particular, the basis weight of the fiber nonwoven fabric is not limited to a particular value so long as the porous intermediate layer is more likely to cause the capillary phenomenon than the porous surface layer is, and is normally 50 to 6,000 g/m$^2$ and preferably 100 to 3,000 g/m$^2$ in view of the likelihood of the occurrence of the capillary phenomenon in the porous intermediate layer and further improvement in sound absorbability in automobile member use.

The basis weight of the fiber nonwoven fabric of the porous surface layer is represented by a value measured by the method below. The nonwoven fabric of the porous surface layer part that is not impregnated with the foaming resin is cut out of the functional laminate, and the basis weight can be calculated from the area and mass of the nonwoven fabric. In the specification, measurement of mass was performed using an electronic balance (AE160 manufactured by Mettler).

For the basis weight of the fiber nonwoven fabric, the value measured from the functional laminate as described above is used; even when measured from a material for use in production (foaming molding), a similar measured value is obtained. That is to say, the basis weight can be calculated from the area and mass of the fiber nonwoven fabric for use in production (foaming molding). In the specification, measurement of mass was performed using an electronic balance (AE160 manufactured by Mettler).

(Resin Foamed Layer)

The resin foamed layer 2 is a foamed layer of a polymer. The polymer forming the resin foamed layer may be any polymer known as a polymer that can form foams in the field of plastics. Specific examples of the resin foamed layer include polymer foamed layers selected from the group including a polyurethane foamed layer; a polyolefin foamed layer such as a polyethylene foamed layer and a polypropylene foamed layer; a polyester foamed layer such as a PET foamed layer; a silicone foamed layer; and a polyvinyl chloride foamed layer.

The resin foamed layer is preferably a polyurethane foamed layer in view of further improvement in sound absorbability in automobile member use.

An average void diameter Df of the resin foamed layer, which is not limited to a particular diameter, may be within a range of 0.04 to 800 µm, for example, especially 10 to 600 µm in accordance with the frequency of a sound to be absorbed. The larger the average void diameter Df of the resin foamed layer becomes within the above range, the higher the frequency of the sound to be absorbed becomes. On the other hand, the smaller the average void diameter Df of the resin foamed layer becomes within the above range, the lower the frequency of the sound to be absorbed becomes.

When the average void diameter Df of the resin foamed layer is 50 to 500 µm, especially 100 to 300 µm, for example, sounds with a frequency of 1,000 to 4,000 Hz are effectively absorbed. Such sound absorption is suitable when the functional laminate is used in cover member use for automobile powertrain members.

The average void diameter Df of the resin foamed layer refers to the diameter of air bubbles in the polymer and is represented by an average diameter measured by the method below. The resin foamed layer is cut out of the functional laminate, and in an optical or electron micrograph of a parallel section of the sample, the diameters of 100 random air bubbles are measured to determine an average.

An average void ratio Rf of the resin foamed layer is normally 60 to 98% and preferably 80 to 95% in view of the likelihood of the occurrence of the capillary phenomenon in the porous intermediate layer and further improvement in sound absorbability in automobile member use.

The average void ratio of the resin foamed layer refers to the volume ratio of air bubbles in the polymer and is represented by a ratio measured by the method below. The resin foamed layer is cut out of the functional laminate, and in an optical or electron micrograph of a perpendicular section of the resin foamed material, the ratios of the area of air bubbles relative to the entire area are measured at 100 random places to determine an average. The average void ratio of the resin foamed layer can also be calculated from the volume and mass of the resin foamed material and properties such as the specific gravity of the polymer. In the specification, measurement of mass was performed using an electronic balance (AE160 manufactured by Mettler). The average void ratio of the resin foamed layer can also be calculated from the volume of the resin foamed material and the void volume of the resin foamed material measured by a method such as computer tomography, an immersion method, a water evaporation method, a suspension method, a mercury penetration method, or a gas adsorption method.

The thickness of the resin foamed layer is normally 1 to 100 mm and preferably 2 to 30 mm in view of the likelihood of the occurrence of the capillary phenomenon in the porous intermediate layer and further improvement in sound absorbability in cover member use for automobile powertrain members.

The thickness of the resin foamed layer is a thickness in a substantially perpendicular direction to the outer surface 12 of the porous surface layer 1, is a thickness to an interface 22 of the resin foamed layer 2 with the porous intermediate layer 3, and is represented by a thickness measured by the method below. In an optical micrograph of a perpendicular section of the functional laminate, thicknesses are measured at 100 random places to determine an average.

(Mixed Layer Part)

The functional laminate 10 of the present disclose includes the mixed layer part 11 between the porous intermediate layer 3 and the porous surface layer 1. Specifically, the porous surface layer 1 includes the mixed layer part 11 at a position facing the porous intermediate layer 3. More specifically, part of the porous surface layer 1 facing the porous intermediate layer 3 is transformed into the mixed layer part 11; in other words, the mixed layer part 11 is generated in the part within the porous surface layer 1 facing the porous intermediate layer 3. The mixed layer part increases the rigidity of the functional laminate.

The mixed layer part is a composite layer of the resin foamed layer and the porous surface layer formed between the porous intermediate layer and the porous surface layer. The mixed layer part is specifically a layer formed by the foaming resin forming the resin foamed layer permeating the porous surface layer, foamed, and cured and, in other words, is a layer in which the material forming the porous surface layer and the material forming the resin foamed layer coexist. In the mixed layer part, within voids of the porous surface layer before the permeation of the foaming resin, air bubbles by the foaming resin are formed.

An average void diameter Dx of the mixed layer part, which is not limited to a particular diameter, may be within a range of 0.04 to 800 µm, for example, especially 10 to 500 µm in accordance with the frequency of the sound to be absorbed. The larger the average void diameter Dx of the mixed layer part becomes within the above range, the higher the frequency of the sound to be absorbed becomes. On the other hand, the smaller the average void diameter Dx of the mixed layer part becomes within the above range, the lower the frequency of the sound to be absorbed becomes.

When the average void diameter Dx of the mixed layer part is 50 to 250 µm, especially 60 to 200 µm, for example, sounds with a frequency of 1,000 to 4,000 Hz are effectively absorbed. Such sound absorption is suitable when the functional laminate is used in cover member use for automobile powertrain members.

The average void diameter Dx of the mixed layer part refers to the diameter of air bubbles in the resin (polymer) formed within the voids of the porous surface layer before the permeation of the foaming resin and is represented by an average diameter measured by the method below. In an optical or electron micrograph of a parallel section of the mixed layer part in the functional laminate, the diameters of 100 random air bubbles are measured to determine an average. The 100 random air bubbles refer to 100 random air bubbles formed by the foaming of the foaming resin, and the air bubbles and the air bubbles that the polymer foam as the porous surface layer intrinsically has can be easily discriminated from each other by a difference in brightness or the like around the air bubbles. The average diameter can also be calculated by cutting the mixed layer part out of the functional laminate and measuring the distribution of the diameter of voids in this mixed layer part by a method such as a mercury penetration method or a gas adsorption method.

An average void ratio Rx of the mixed layer part is normally 30 to 95% and preferably 50 to 90% in view of further improvement in sound absorbability in cover member use for automobile powertrain members.

The average void ratio of the mixed layer part refers to the volume ratio of air bubbles in the resin (polymer) formed within the voids of the porous surface layer before the permeation of the foaming resin and is represented by a ratio measured by the method below. In an optical or electron micrograph of a perpendicular section of the mixed layer part in the functional laminate, the ratios of the area of air bubbles relative to the entire area are measured at 100 random places to determine an average. The area of air bubbles is the area of air bubbles in the resin (polymer) formed by the foaming of the foaming resin within the voids of the porous surface layer; when the porous intermediate layer is a polymer foam, the air bubbles and the air bubbles that the polymer foam intrinsically has can be easily discriminated from each other by a difference in brightness or the like around the air bubbles. As another method of measurement, the mixed layer part is cut out of the functional laminate, and the average void ratio of the mixed layer part can be calculated from the volume and mass of the mixed layer part and properties such as the specific gravity of the polymer. The average void ratio of the mixed layer part can also be calculated from the volume of the mixed layer part and the void volume of the mixed layer part measured by a method such as computer tomography, an immersion method, a water evaporation method, a suspension method, a mercury penetration method, or a gas adsorption method.

The thickness of the mixed layer part is normally 0.05 to 3 mm, preferably 0.1 to 2 mm, and more preferably 0.3 to 1.7 mm in view of further improvement in sound absorbability in cover member use for automobile powertrain members.

The thickness of the mixed layer part refers to a thickness in a substantially perpendicular direction to the outer surface 12 of the porous surface layer 1, is a thickness from an interface 13 of the porous surface layer 1 with the porous intermediate layer 3 to a region within the porous surface layer 1 that is not impregnated with the foaming resin, and is represented by a thickness measured by the method below. In an optical or electron micrograph of a perpendicular section near the mixed layer part in the functional laminate, thicknesses are measured at 100 random places to determine an average. In the optical or electron micrograph, that the porous surface layer 1 is impregnated with the foaming resin or is not impregnated therewith can be easily discriminated from each other by the presence or absence of the foaming resin within voids of the porous surface layer 1.

[Production Method for Functional Laminate]

The functional laminate of the present disclosure can be produced by a production method including a lamination base forming process and a foaming molding process below.

(Lamination Base Forming Process)

In the present process, the porous surface layer 1 and the porous intermediate layer 3 are laminated together to obtain a lamination base 40. The lamination may be performed by simply placing another layer on one layer; in view of the handleability of the lamination base, the porous surface layer 1 and the porous intermediate layer 3 are preferably connected to each other.

The method of bonding is not limited to a particular method so long as connection between the porous surface layer 1 and the porous intermediate layer 3 is achieved; a method using an adhesive may be employed, for example. The bonding may be achieved at part of a contact face between the porous surface layer 1 and the porous intermediate layer 3 or achieved across the entire contact face. The bonding is preferably achieved at part of the contact face between the porous surface layer 1 and the porous intermediate layer 3 in view of further improvement in sound absorbability in cover member use for automobile powertrain members.

For the porous surface layer 1 and the porous intermediate layer 3, the respective materials described above can be used, which are commercially available. When the porous surface layer 1 and the porous intermediate layer 3 are each a fiber nonwoven fabric in particular, certain fibers adjusted to desired properties and formed by a known method of forming such as heat press molding or needle punching (a sheet-shaped material) can be used.

Figure 2A:
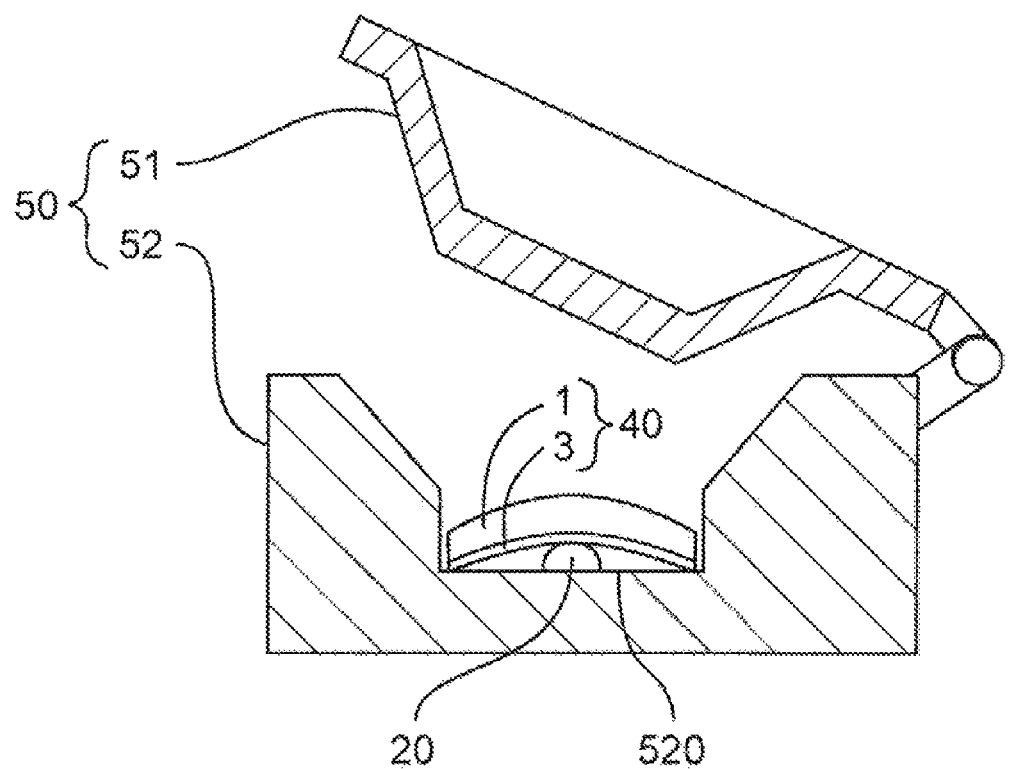
FIG. 2A illustrates a schematic sectional view of a mold and the inside thereof for illustrating a foaming preparation stage of a foaming molding process in a production method for a functional laminate of the present disclosure.

(Foaming Molding Process) In the present process, as illustrated in FIG. 2A, foaming molding is performed within a mold 50. The mold 50 normally includes an upper mold 51 and a lower mold 52. FIG. 2A illustrates a schematic sectional view of the mold and the inside thereof for illustrating a foaming preparation stage of the foaming molding process.

Figure 2B:
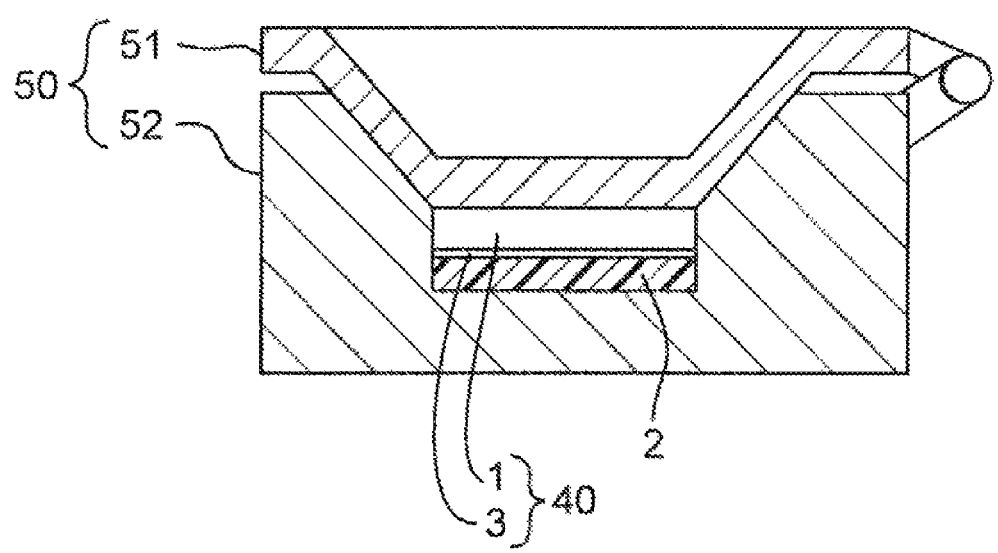
FIG. 2B illustrates a schematic sectional view of the mold and the inside thereof for illustrating a foaming stage of the foaming molding process in the production method for a functional laminate of the present disclosure.

The foaming molding is performed on the side facing the porous intermediate layer 3 of the lamination base 40 using a foaming resin 20 as a raw material forming the resin foamed layer 2. Performing the foaming molding on the side facing the porous intermediate layer 3 of the lamination base 40 means that the foaming molding is performed with the foaming resin 20 and the lamination base 40 placed such that the resin foamed layer 2 will be formed on the side of the porous intermediate layer 3 of the lamination base 40. As illustrated in FIG. 2A, for example, the foaming resin 20 is injected onto a molding face 520 of the lower mold 52, and then the lamination base 40 is placed on the foaming resin 20 so as to bring the porous intermediate layer 3 into contact with the foaming resin 20. (The lamination base 40 may be placed on the upper mold 51 so as to bring the porous intermediate layer 3 into contact with the foaming resin 20.) Subsequently, the upper mold 51 is closed as illustrated in FIG. 2B, and upon start of foaming, the foaming resin 20 expands to fill a cavity between the upper mold 51 and the lower mold 52, and the resin foamed layer 2 is formed. The molded body is removed from the mold to obtain a functional laminate in which the porous surface layer 1, the resin foamed layer 2, and the porous intermediate layer 3 are integrated together. FIG. 2B illustrates a schematic sectional view of the mold and the inside thereof for illustrating a foaming stage of the foaming molding process.

The foaming resin 20 is a raw material of the resin foamed layer; when the resin foamed layer is a polyurethane foamed layer, for example, a mixture of a polyol compound and an isocyanate compound is used for the foaming resin 20. The foaming resin 20 may contain additives such as a foaming agent and a foam stabilizer.

Foaming conditions are determined as appropriate in accordance with the type of the foaming resin 20; the mold 50 may be heated and/or the inside of the mold 50 may be pressurized or decompressed, for example.

[Uses]

The functional laminate 10 of the present disclosure is excellent in sound absorbability, thermal insulating properties, and damping properties (especially sound absorbability) and is thus useful as sound absorbing materials, thermal insulating materials, and/or damping materials (especially sound absorbing materials).

Examples of fields in which the functional laminate 10 of the present disclosure is useful include engine-equipped machines such as vehicles (such as automobiles, trucks, buses, and trains) and agricultural machines (such as mowers and cultivators).

When the functional laminate 10 of the present disclosure is used as a sound absorbing thermal insulating material in an engine-equipped machine, for example, it is specifically used as a cover member for powertrain members including an engine and a transmission. In this situation, the functional laminate 10 is more specifically used as a cover member surrounding the powertrain members partially or collectively. The functional laminate 10 is placed and used such that the resin foamed layer 2 is in contact with the powertrain members. Alternatively, the functional laminate 10 is used such that the porous surface layer 1 faces a sound source and/or a heat source in a noncontact manner, that is, such that the engine and the transmission are placed facing the porous surface layer 1.

EXAMPLES

Other Aspects of the Present Disclosure

The porous intermediate layer may be more likely to cause a capillary phenomenon than the porous surface layer is owing to a difference in an average void diameter.

The porous intermediate layer may be a nonwoven fabric of organic fibers selected from the group consisting of polyester fibers, polyamide fibers, polyvinyl alcohol fibers, polyolefin fibers, and cellulose fibers.

The porous surface layer may have a thickness of 1 to 50 mm. The resin foamed layer may be a polymer foamed layer selected from the group consisting of a polyurethane foamed layer, a polyolefin foamed layer, a polyester foamed layer, a silicone foamed layer, and a polyvinyl chloride foamed layer.

The functional laminate may be used as a sound absorbing material, a thermal insulating material, and/or a damping material.

The functional laminate may be placed and used such that the resin foamed layer is in contact with a heat source and/or a sound source or is placed and used such that the porous surface layer faces a heat source and/or a sound source in a noncontact manner.

The functional laminate may be used as a cover member for powertrain members including an engine and a transmission of an automobile.
(Method of Measurement)
Various kinds of properties of layers were measured by the methods described above.
(Method of Evaluation)
Sound Absorption Coefficient (α):

Using a normal incident sound absorption coefficient measurement system WinZacMTX manufactured by Nihon Onkyo Engineering Co., Ltd., a normal incident sound absorption coefficient was measured using a sound tube with an inner diameter of 40 mm in a measurement frequency range of from 200 to 4,800 Hz (⅓ octave band) (in conformity with JIS A 1405-2 and ISO 10534-2) to calculate an average normal incident sound absorption coefficient for 1,000 to 4,000 Hz. The functional laminate was used such that the porous surface layer 1 faced a sound source.

Thermal Conductivity:

Using a stationary method thermal conductivity measurement apparatus HFM 436/3/1 Lambda manufactured by Netzsch, at a measurement temperature of 30° C., the thermal conductivity of the functional laminate in the thickness direction was measured based on JIS A 1412-2 Part 2: Heat flow meter method.

Examples 1 and 2

Lamination Base Forming Process

Glass Wool A with an average fiber diameter of about 7.5 µm was heat press molded so as to have an average void diameter, an average void ratio, and a thickness listed in Table 1 to obtain the porous surface layer 1. The porous intermediate layer 3 in Table 1 was bonded to this porous surface layer 1 to obtain the lamination base 40. The bonding was achieved with an adhesive at part of a contact face between the porous surface layer and the porous intermediate layer.

Foaming Molding Process

A raw material of a polyurethane foam in Table 1 was mixed with a mixer as the foaming resin 20 and was injected onto the molding face 520 of the lower mold 52 as illustrated in FIG. 2A. Next, the lamination base 40 was placed on the foaming resin 20 so as to bring the porous intermediate layer 3 into contact with the foaming resin 20. Subsequently, in a 25° C., normal pressure environment, the upper mold 51 was closed as illustrated in FIG. 2B, and upon start of foaming, the foaming resin 20 expanded to fill the cavity (dimensions: 100 mm×100 mm×25 mm) between the upper mold 51 and the lower mold 52, and the resin foamed layer 2 was formed. The mold 50 was cooled, then the molded body was removed from the mold to obtain a functional laminate in which the porous surface layer 1, the resin foamed layer 2, and the porous intermediate layer 3 are integrated together.

Examples 3 to 5 and Comparative Examples 1 and 2

The lamination base forming process and the foaming molding process were performed by a method similar to that of Example 1 except that Glass Wool B with an average fiber diameter of about 3.5 µm that had been heat press molded to have an average void diameter, an average void ratio, and a thickness listed in Table 1 was used as the porous surface layer 1 and that the porous intermediate layer 3 in Table 1 was used.

Example 6

The lamination base forming process and the foaming molding process were performed by a method similar to that of Example 1 except that PET fibers with a fiber length of 51 mm and a fineness of 2.2 deniers (an average fiber diameter of about 16 µm) that had been formed in a sheet shape by needle punching and with an adhesive so as to have an average void diameter, an average void ratio, and a thickness listed in Table 1 was used as the porous surface layer 1 and that the porous intermediate layer 3 in Table 1 was used.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Porous Surface Layer | Material Type | Glass Wool A | Glass Wool A | Glass Wool B | Glass Wool B | Glass Wool B | PET Nonwoven Fabric | Glass Wool B | Glass Wool B |

TABLE 1-continued

|  |  | Example 1 | Example 2 | Example 3 | Example 4 | Example 5 | Example 6 | Comparative Example 1 | Comparative Example 2 |
|---|---|---|---|---|---|---|---|---|---|
|  | Average Void Diameter | 111 μm | 111 μm | 46 μm | 52 μm | 55 μm | 102 μm | 52 μm | 22 μm |
|  | Average Void Ratio | 98% | 98% | 96% | 98% | 99% | 98% | 98% | 88% |
|  | Thickness | 20 mm | 20 mm | 20 mm | 20 mm | 20 mm | 20 mm | 20 mm | 20 mm |
| Mixed Layer Part | Average Void Diameter | 150 μm | 150 μm | 100 μm | 110 μm | 110 μm | 140 μm | 45 μm | 35 μm |
|  | Average Void Ratio | 60% | 60% | 55% | 55% | 55% | 65% | 55% | 50% |
|  | Thickness | 1.2 mm | 0.4 mm | 1.2 mm | 1.2 mm | 1.2 mm | 1.2 mm | 2.1 mm | 2.2 mm |
| Porous Intermediate Layer | Material Type | PP Nonwoven Fabric A | PP Nonwoven Fabric B | PP Nonwoven Fabric A | PP Nonwoven Fabric A | PP Nonwoven Fabric A | PP Nonwoven Fabric A | — | PP Nonwoven Fabric C |
|  | Average Void Diameter | 44 μm | 21 μm | 44 μm | 44 μm | 44 μm | 44 μm | — | 65 μm |
|  | Average Void Ratio | 84% | 71% | 84% | 84% | 84% | 84% | — | 89% |
|  | Thickness | 0.28 mm | 0.76 mm | 0.28 mm | 0.28 mm | 0.28 mm | 0.28 mm | — | 0.15 mm |
| Resin Foamed Layer | Material Type | Polyurethane Foam A | Polyurethane Foam A | Polyurethane Foam A | Polyurethane Foam A | Polyurethane Foam A | Polyurethane Foam A | Polyurethane Foam A | Polyurethane Foam A |
|  | Average Void Diameter | 200 μm | 200 μm | 200 μm | 200 μm | 200 μm | 200 μm | 200 μm | 200 μm |
|  | Average void ratio | 87% | 87% | 87% | 87% | 87% | 87% | 87% | 87% |
|  | Thickness | 5 mm | 5 mm | 5 mm | 5 mm | 5 mm | 5 mm | 5 mm | 5 mm |
| Rs/Rm |  | 1.17 | 1.38 | 1.14 | 1.17 | 1.18 | 1.17 | — | 0.99 |
| Ds/Dm |  | 2.52 | 5.29 | 1.05 | 1.18 | 1.25 | 2.32 | — | 0.34 |
| 1,000-4,000 Hz Sound Absorption Coefficient (1/3 Octave Band) |  | 88.4% | 87.2% | 88.9% | 89.4% | 87.6% | 87.4% | 85.1% | 47.9% |
| Thermal Conductivity |  | 0.039 | 0.039 | 0.037 | 0.035 | 0.037 | 0.040 | 0.036 | 0.040 |

Glass Wool A: Glass fibers having an average fiber diameter of about 7.5 μm and an average fiber length of about 50 mm (the basis weight of the porous surface layer 1 with Glass Wool A, Examples 1 and 2: 960 g/m$^2$)
Glass Wool B: Glass fibers having an average fiber diameter of about 3.5 μm and an average fiber length of about 50 mm (the basis weight of the porous surface layer 1 with Glass Wool B, Example 3: 1,920 g/m$^2$, Example 4: 960 g/m$^2$, Example 5: 480 g/m$^2$, Comparative Example 1: 960 g/m$^2$, and Comparative Example 2: 6,000 g/m$^2$)
PP Nonwoven Fabric A: SP-1040E (manufctured by Maeda Kosen Co., Ltd., basis weight: 40 g/m$^2$)
PP Nonwoven Fabric B: SP-1200E (manufctured by Maeda Kosen Co., Ltd., basis weight: 200 g/m$^2$)
PP Nonwoven Fabric C: SP-1017E (manufctured by Maeda Kosen Co., Ltd., basis weight: 17 g/m$^2$)
Raw material of Polyurethane Foam A: DK System (manufactured by DKS Co. Ltd.)

INDUSTRIAL APPLICABILITY

The functional laminate of the present disclosure is useful as sound absorbing materials, thermal insulating materials, and/or damping materials in the field of engine-equipped machines such as vehicles (such as automobiles, trucks, buses, and trains) and agricultural machines (such as mowers and cultivators).

DESCRIPTION OF REFERENCE CHARACTERS

1 Porous Surface Layer
2 Resin Foamed Layer
3 Porous Intermediate Layer
10 Functional Laminate
11 Mixed Layer Part
12 Outer Surface of Porous Surface Layer
13 Interface of Porous Surface Layer with Porous Intermediate Layer
20 Foaming Resin
22 Interface of Resin Formed Layer with Porous Intermediate Layer
32 Interface of Porous Intermediate Layer with Porous Surface Layer
33 Interface of Porous Intermediate Layer with Resin Formed Layer
40 Lamination Base
50 Mold
51 Upper Mold
52 Lower Mold
520 Molding Face of Lower Mold

The invention claimed is:

1. A functional laminate including a porous intermediate layer having air permeability laminated between a porous surface layer and a resin foamed layer,
    the porous intermediate layer having an average void ratio smaller than that of the porous surface layer, wherein
    the porous surface layer includes, at a position facing the porous intermediate layer, a mixed layer part of the resin foamed layer and the porous surface layer, and
    the mixed layer part has a thickness of 0.3 to 1.7 mm.

2. The functional laminate of claim 1, wherein
    the mixed layer part has an average void diameter of 60 to 200 μm.

3. The functional laminate of claim 1, wherein
    the mixed layer part has an average void ratio of 50 to 90%.

4. The functional laminate of claim 1, wherein
    the porous intermediate layer has an average void diameter smaller than that of the porous surface layer.

5. The functional laminate of claim 1, wherein the porous intermediate layer has an average void ratio of 60 to 95%.

6. The functional laminate of claim 1, wherein the porous intermediate layer has an average void diameter of 0.04 to 90 µm.

7. The functional laminate of claim 1, wherein the porous intermediate layer has a thickness of 0.1 to 2 mm.

8. The functional laminate of claim 1, wherein the porous intermediate layer is a fiber nonwoven fabric.

9. The functional laminate of claim 8, wherein fibers forming the fiber nonwoven fabric of the porous intermediate layer have an average fiber diameter of 0.005 to 50 µm.

10. The functional laminate of claim 8, wherein the fiber nonwoven fabric of the porous intermediate layer has a basis weight of 5 to 500 g/m$^2$.

11. The functional laminate of claim 1, wherein the porous surface layer has an average void ratio of 80 to 99.5%.

12. The functional laminate of claim 1, wherein the porous surface layer has an average void diameter of 10 to 300 µm.

13. The functional laminate of claim 1, wherein the porous surface layer is a fiber nonwoven fabric.

14. The functional laminate of claim 1, wherein the porous surface layer is a nonwoven fabric of inorganic fibers or a nonwoven fabric of organic fibers.

15. The functional laminate of claim 13, wherein fibers forming the fiber nonwoven fabric of the porous surface layer have an average fiber diameter of 0.005 to 50 µm.

16. The functional laminate of claim 13, wherein the fiber nonwoven fabric of the porous surface layer has a basis weight of 50 to 6,000 g/m$^2$.

17. The functional laminate of claim 1, wherein the resin foamed layer has an average void diameter of 0.04 to 800 µm.

18. A method for producing the functional laminate of claim 1, the method comprising:
    laminating the porous surface layer and the porous intermediate layer together to obtain a lamination base; and
    performing foaming molding of a foaming resin forming the resin foamed layer on a side facing the porous intermediate layer of the lamination base inside a mold.

19. A functional laminate including a porous intermediate layer having air permeability laminated between a porous surface layer and a resin foamed layer,
    the porous intermediate layer having an average void ratio smaller than that of the porous surface layer, wherein
    the porous surface layer includes, at a position facing the porous intermediate layer, a mixed layer part of the resin foamed layer and the porous surface layer, and
    the mixed layer part has an average void diameter of 60 to 200 µm.

* * * * *